Nov. 19, 1963   C. L. MUZZI   3,111,033
ELECTRICAL INDICATING APPARATUS
Filed Sept. 23, 1960   2 Sheets-Sheet 2
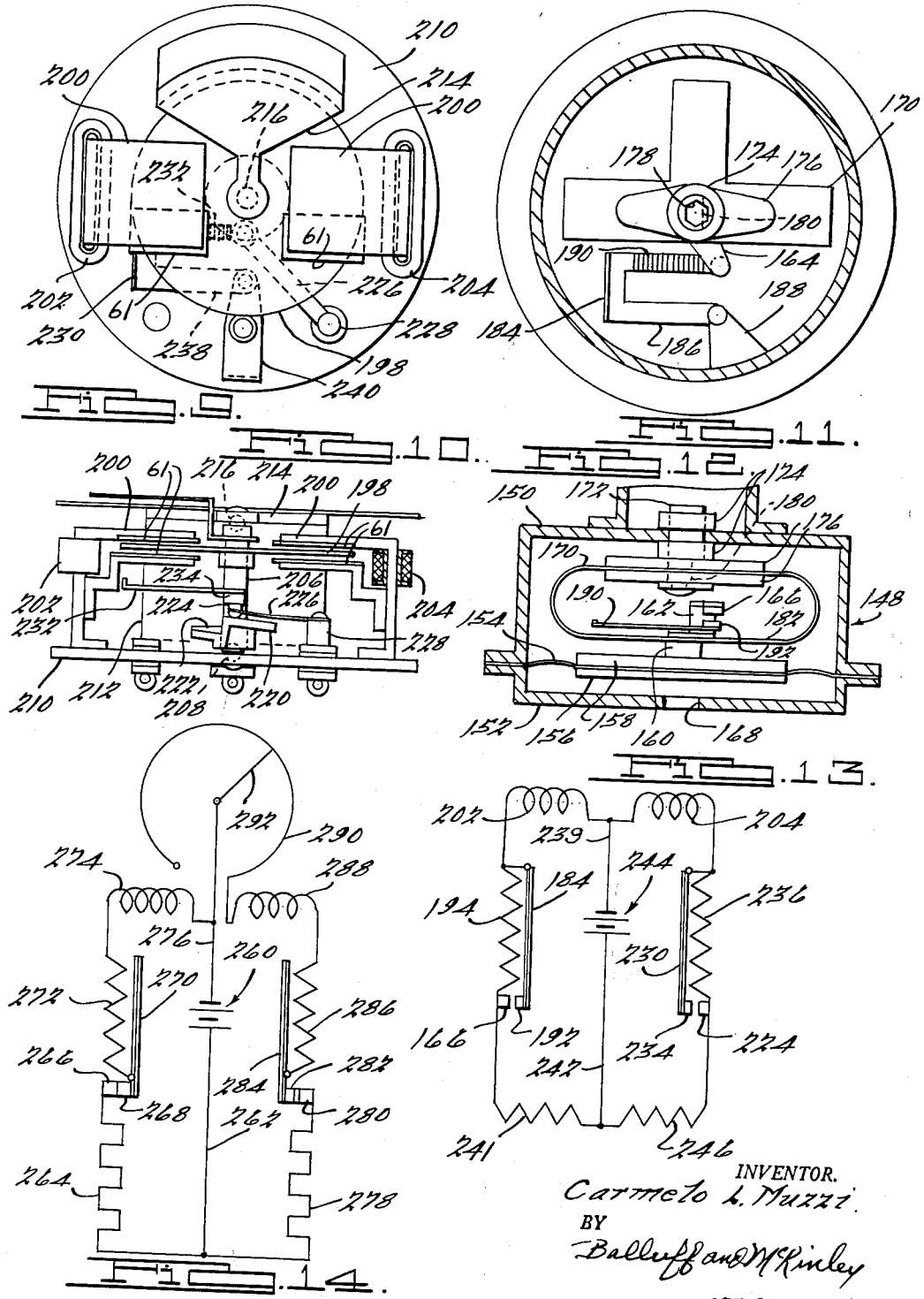
INVENTOR.
Carmelo L. Muzzi
BY
Balluff and McKinley
ATTORNEYS United States Patent Office 3,111,033
Patented Nov. 19, 1963

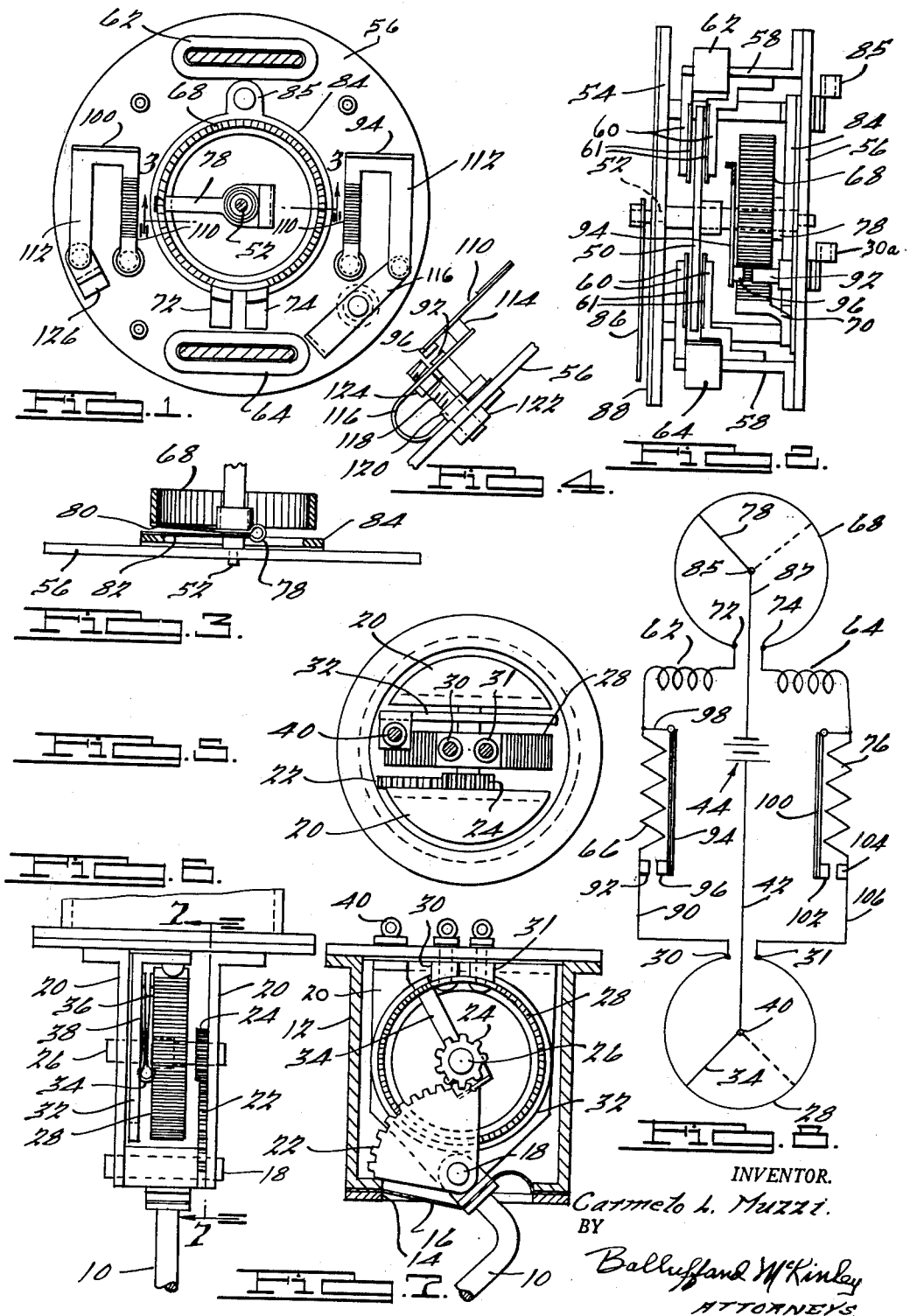

3,111,033
ELECTRICAL INDICATING APPARATUS
Carmelo L. Muzzi, 22 Charlotte Ave., Detroit, Mich.
Filed Sept. 23, 1960, Ser. No. 58,044
8 Claims. (Cl. 73—362)

This invention relates to electrical indicating or measuring apparatus and has particular reference to a new and improved electrical circuit and apparatus for indicating or recording any of a variety of conditions such as temperature, pressure or mechanical movements of any kind. In general, the apparatus comprises a shaded pole induction motor and a pair of induction coils associated therewith through which current is pulsed by a thermally actuated vibrator, the coils and poles associated therewith tending to turn the rotor in opposite directions. In one form of the invention each of the coils is in one branch of a series-parallel circuit which includes a fixed resistance and a variable resistance and a thermally actuated vibrator arm forming a shunt circuit around the fixed resistance whereby a change in the variable resistance resulting from a change in the condition being sensed changes the frequency of vibration of the vibrator thereby to cause an unbalance in the pulsing of current through the coils which produces rotation of the rotor. Rotation of the rotor is employed for changing the variable resistance of the other branch of the circuit until the resistances are in balance whereby the two vibrators will again vibrate at identical frequencies with the rotor at rest until a further change in the condition being sensed occurs. An indicating device is operated by the rotor so that the change in the condition being sensed is immediately indicated by rotation of the rotor.

In another form of the invention the device may be used to indicate temperature differentials and in this case one branch of the circuit has a resistance which is relatively insensitive to temperature change while the other circuit has a resistance which is extremely sensitive to temperature change, the vibrator devices being employed to open and close the two branches of the circuit so that any change in temperature immediately changes the resistance in one branch of the circuit and thereby changes the frequency of vibration of the vibrator in that branch which in turn causes an unbalance in the pulsing of current through the coils to effect rotation of the rotor. Rotation of the rotor changes the resistance of the other branch until it is in balance with the resistance in the first branch.

In a third form of the invention a change in the condition being sensed effects a change in the spacing of the contacts which are opened and closed by the vibrator in one branch of the circuit, thereby unbalancing the frequency of vibration and the current pulsed through the two coils of the induction motor to turn the rotor to indicate such change. The rotor is employed to change the spacing of the contacts operated by the other vibrator until the frequnecies of the vibrators are in balance.

A principal object of the invention is to provide a new and improved electrical indicating apparatus.

A further object of the invention is to provide an electrical indicating device which is extremely accurate and which will immediately register any change in the condition being sensed.

Another object of the invention is to provide a device of the type described including a rotor and a pair of induction coils associated therewith operable to rotate the same in opposite directions and thermoelectric vibratory means for each of the coils operable to change the frequency of the current being pulsed through the coils in response to a change in the condition being sensed to effect rotation of the rotor and in which movement of the rotor effects a corresponding change in the frequency of the vibrator associated with the other coil to return the system to a balanced condition.

In the drawings:

FIG. 1 is a plan view with shaded poles and parts removed of the indicating portion of an electrical apparatus embodying the present invention;

FIG. 2 is a side elevational view of the apparatus shown in FIG. 1;

FIG. 3 is a sectional view taken on line 3—3 of FIG. 1;

FIG. 4 is an elevational view of a part of the structure shown in FIG. 1;

FIG. 5 is a plan view of the condition sensing part of the apparatus;

FIG. 6 is a side elevational view of the condition sensing apparatus;

FIG. 7 is a sectional view taken on line 7—7 of FIG. 6;

FIG. 8 is a wiring diagram illustrating the circuit employed in the apparatus;

FIG. 9 is a plan view of the indicating portion of a modified form of the invention;

FIG. 10 is an elevational view of the apparatus shown in FIG. 9;

FIG. 11 is a plan view of the condition sensing part of the modified form of the invention;

FIG. 12 is an elevational view of the apparatus shown in FIG. 11;

FIG. 13 is a circuit diagram illustrating the apparatus shown in FIGS. 9 to 12; and FIG. 14 is a circuit diagram illustrating a further modified form of the invention.

The apparatus includes a condition sensing mechanism illustrated in FIGS. 5, 6 and 7 and a receiving or indicating apparatus illustrated in FIGS. 1 to 4. The invention as shown in FIGS. 1 to 7 is used for indicating the level of liquid in a tank through movement of an arm 10 having a float on the end thereof extending into the liquid so that a change in the liquid level will effect rotation of the arm 10 which through the mechanism to be described operates an electrical circuit by means of which the level of the liquid can be measured. It will be apparent that the apparatus shown in this form of the invention could be used to indicate mechanical movements of various types or any other change of condition which could be translated into movement of the arm 10.

The sensing portion of the apparatus shown in FIGS. 5 to 7 comprises a casing 12 having an opening 14 in its bottom wall closed by a flexible diaphragm 16 through which the end of the arm 10 passes and is secured to permit pivoting of the arm 10 on a shaft 18 which is supported by and extends between a pair of mounting brackets 20 secured to and extending downwardly from the cover of the housing 12. A sector gear 22 is mounted on the shaft 18 for rotation with the arm 10 and is meshed with a pinion 24 secured on a pin 26 journaled in the brackets 20. A variable resistance in the form of a slide wire 28 is supported within the casing 12 by terminal posts 30 and 31 secured to the cover of the housing 12. The slide wire 28 may comprise a ring having a wire wound thereon with the ends of the wire connected to the terminals 30 and 31. A collector ring 32 is also secured to the top wall of the housing and extends downwardly therefrom along one of the brackets 20 in opposed relation to the slide wire 28. A contact arm 34 is secured on the pin 26 for rotation with the pinion 24 and has one leg 36 thereof engaging the slide wire 28 and its other leg 38 engaging the collector ring 32. The collector ring 32 is provided with a terminal 40 which is connected by a line 42 to a source of current 44 (see FIG. 8).

The indicating portion of the apparatus comprises an induction motor having a rotor 50 secured on a shaft 52 journaled in bearings in the supporting plates 54 and 56.

A pair of supporting brackets 58 are secured on the plate 56 and shaded poles 60 are mounted on each bracket 58 in closely spaced relation to the rotor 50. A coil 62 is associated with one pair of poles 60 and a coil 64 is associated with the other pair of poles 60. The poles 60 are shaded by copper plates 61 secured on the faces of the poles opposite the rotor 50. The coils 62 and 64, the poles and the shading thereon are arranged relative to the rotor 50 so that one of such coils tends to rotate the rotor in one direction while the other tends to rotate the rotor in the opposite direction.

Referring now to FIG. 8, there is illustrated a series-parallel circuit one branch of which includes the coil 62, a fixed resistance 66 and a variable resistance in series therewith, the variable resistance constituting that portion of the slide wire 28 between the terminal 30 and the leg 36 of the contact arm 34. A second slide wire 68 is supported by a bracket 70 from the support plate 56 and has one terminal 72 thereof connected to the coil 62 and its other terminal 74 connected to the coil 64. The coil 64 has a fixed resistance 76 and that portion of the slide wire 28 between the terminal 31 and the contact leg 36 in series therewith.

A contact arm 78 has a leg 80 engaging the slide wire 68 and a leg 82 engaging a collector ring 84 which is mounted on the support plate 56. A terminal 85 on the collector ring 84 is connected by line 87 to the current source 44. The contact arm 78 is secured on the rotor shaft 52 for rotation therewith and a pointer 86 is secured on the end of the rotor shaft and is cooperable with a dial or scale 88 to give an indication of the condition being sensed or measured.

The terminal 30 which leads from one end of the slide wire 28 is connected by a line 90 to a fixed contact 92 and terminal 30a of FIG. 2 at one end of the fixed resistance 66. A bimetallic vibrator arm 94 has a contact 96 thereon and is connected by a line 98 into the circuit between the coil 62 and the fixed resistance 66. The vibrator arm 94 forms a shunt circuit around the resistance 66 and is positioned adjacent the resistance 66 or the resistance may be wound around the arm 94 so that the latter is responsive to the heat resulting from the flow of current through the resistance 66 to open and close the contacts 92 and 96 and thereby shunt the resistance 66 at a frequency which depends upon the current in that branch of the circuit.

The branch of the circuit which includes the coil 64 is also provided with a means for shunting the resistance 76 which comprises a bimetal vibrator arm 100 provided with a contact 102 engageable with a fixed contact 104 located in the line 106 between the fixed resistance 76 and the terminal 31 which is at one end of the slide wire 28.

The vibrator arms 94 and 100 are of similar construction and each comprises a U-shaped bimetallic element having a leg 110 which is thermally responsive to the associated fixed resistance 66 or 76 and which is provided at its outer end with the contact 96 or 102. The other leg 112 of the arm 94 is secured by a part 114 to the free end of a leaf spring 116 which is secured by a bolt 118 and nuts 120 and 122 of the plate 56. The bolt 118 extends through an aperture in the leaf spring 116 and a nut 124 on the bolt 118 engages the spring 116 so that turning of the bolt 118 will adjust the tension of the spring 116 thereby to adjust the air gap between the contacts 92 and 96 so that the spacing thereof is the same as that between the contacts 102 and 104. The other vibrator arm 100 has the leg 112 thereof secured to a spring clip 126 while its other leg 110, which carries the contact 102, extends through or is positioned adjacent the resistance 76. The vibrator arms 94 and 100 are preferably made in the form shown so that the layers of metal may be reversed as between the arms 110 and 112 thereof thereby to compensate for any temperature variation in the surrounding atmosphere.

When no change is occurring in the condition being sensed, the apparatus will be in a state of balance and the rotor 50 will be stationary. At such time the increment of the slide wire 68 which is in series with the coil 62 will be exactly equal to the increment of the slide wire 28 which is in series with the coil 64. Under these conditions the vibrator arms 94 and 100 will vibrate at identical frequencies so that the rotative force exerted on the rotor 50 by the coils 62 and 64 and their associated shaded poles will be balanced. When any change occurs in the condition being sensed, movement will be imparted to the arm 10 of the sensing device which through the arrangement described will rotate the contact arm 34 around the slide wire 28 to a new position thereby increasing or decreasing the resistance in one branch of the circuit with a corresponding decrease or increase in the resistance in the other branch of the circuit. In the circuit diagram shown in FIG. 8, the dotted-line position of the contact arm 34 and the solid-line position of arm 78 represent a balanced condition. When the arm 34 moves to the solid-line position shown in FIG. 8, the branch containing the coil 62 will have less resistance than the branch containing the coil 64. This condition results in a difference in the frequency of vibration of arms 94 and 100. When the vibrator arm 94 closes contacts 92 and 96, there is a surge of current in the induction coil 62 which generates a magnetic flux at the unshaded portion of the poles 60 associated with the coil 62. As the current surge through the coil is abated, the magnetic flux moves toward the center of the poles. The heat generated by the resistance 66 causes the arm 94 to open contacts 92 and 96, whereupon the magnetic flux decays, generating an electromotive force opposing this change in flux, thereby imparting torque to the rotor 50 in a counterclockwise direction as viewed in FIG. 9. The other vibrator arm 100, of course, operates in the same way to impart torque in a clockwise direction to the rotor 50 but, due to the change in the resistances in the two branches of the circuit, one of the vibrator arms will vibrate more rapidly than the other, thereby imposing more torque on the rotor in one direction than the other and causing the rotor to rotate. When the contact arm 78 which turns with the rotor reaches the dotted-line position shown in FIG. 8 the system will be back in balance and movement of the rotor will cease. The vibrator arms 94 and 100 will then be vibrating at the same frequencies and the rotor will remain stationary until a subsequent change in the condition being sensed occurs.

The invention is shown in FIGS. 9 to 13 in connection with an apparatus adapted to indicate pressure. The sensing unit may comprise a housing 148 consisting of upper and lower halves 150 and 152 having a flexible diaphragm 154 clamped between the upper and lower halves of the housing. A pair of plates 156 and 158 engage the opposite surfaces of the central portion of the diaphragm 154 and a bracket 160 secured on the upper plate 158 has an upwardly extending portion 162 provided with an arm 164 having a contact 166 at its outer end. The bottom wall of the housing is provided with an opening 168 to communicate the interior of the housing below the diaphragm 154 with the pressure to be recorded by the apparatus.

A leaf spring 170 in the form of a loop is located within the housing and is supported from the top wall of the housing by a bolt 172 having nuts 174 secured thereon and a flat portion 180 extending through a pair of cam plates 176 which engage the opposite surfaces of the spring loop 170. The bolt 172 is provided with a socket 178 in its upper end by means of which the bolt may be turned so that the flat portion 180 thereof which extends through the cam plates 176 will effect rotation of the cam plates 176 to change their point of engagement with the spring 170 thereby to regulate the tension of the spring. The lower run 182 of the spring is secured to the bracket 160 which carries the contact 166.

An electrically conducting bimetallic vibrator arm 184 has one leg 186 secured to a bracket 188, while the other leg 190 has a contact 192 adapted to engage and disengage the contact 166. The vibrator arm 184 may be similar to that described in connection with the previous modification with the leg 190 thereof positioned adjacent a resistance heater 194 or with the resistance 194 wound around the leg 190.

The receiving or indicating portion of the apparatus is shown in FIGS. 9 and 10 and includes an induction motor comprising a rotor 198 having a pair of shaded poles 200 shaded by copper plates 61 closely spaced from its opposite surfaces with an induction coil 202 associated with one pair of shaded poles and a coil 204 associated with the other pair of poles. The rotor 198 is secured on and rotatable with a rotor shaft 206 supported at its lower end on a ball bearing 208 located within a socket on the supporting plate 210. A bracket 212 is secured to the plate 210 and has a portion 214 overlying the rotor 198 and provided with a socket receiving a ball bearing 216 which also engages within a socket in the upper end of the rotor shaft 206 to rotatably support the rotor 198. A cam 220 is secured on the lower end of the rotor shaft 206 and is provided with a helical cam surface 222 which is engaged by a contact 224 secured on the outer end of a spring arm 226 mounted on a terminal post 228 supported on the plate 210. A vibrator arm 230 similar in construction to that previously described has one leg 232 which vibrates in response to the heat generated by the resistance heater 236 and is provided with a contact 234 cooperable with the contact 224 on the arm 226. The other leg 238 of the vibrator 230 is secured to a spring arm 240 similar to the spring arm 116 shown in FIG. 4 in order to allow the spacing of the contacts 224 and 234 to be properly calibrated.

Referring now to FIG. 13, it will be seen that the circuit is a series-parallel circuit, one branch of which includes the coil 202, the resistance 194, contact 166, a resistance 241 and a line 242 connected to the current source 244. The other branch of the circuit comprises the line 242, resistance 246, contact 224, resistance 236, coil 204 and line 239. The vibrator arm 184 is connected into one branch of the circuit and forms a shunt circuit around the resistance 194, while the vibrator arm 230 in the indicating portion of the apparatus is connected into the other branch and forms a shunt around resistance 236.

When the pressure being indicated or recorded is constant, the spacing of contacts 166 and 192 will be equal to the spacing of contacts 224 and 234 and vibrator arms 184 and 230 will vibrate at the same frequencies so that the coils 202 and 204 will have the same current therein. Since these coils and the poles 200 associated therewith tend to rotate the rotor 198 in opposite directions, the system will be in balance and no rotation of the rotor will occur. Any change in the pressure being indicated will be transmitted to the diaphragm 154 to effect movement thereof to vary the air gap between the contacts 166 and 192. As the spacing of contacts 166 and 192 changes, the frequencies of vibration of the arms 184 and 230 will change so that current will be pulsed through one of the coils at a higher frequency than through the other coil with resultant rotation of the rotor 198 to indicate the change in pressure. As the rotor 198 turns, the cam 220 rotates therewith and the contact 224 on the end of arm 226 follows the cam surface 222 to change the spacing of the contacts 224 and 234 until such spacing is the same as the spacing of contacts 166 and 192, at which time the vibrator arms will again vibrate at the same frequency and the system will again be in balance.

FIG. 14 is a wiring diagram illustrating a device of this type used as a temperature indicating instrument. In this form of the invention a series-parallel circuit is again employed including a source of current 260 with one branch of the circuit consisting of a line 262 leading from the current source, a resistance 264, a contact 266, a movable contact 268 carried by a bimetallic vibrator arm 270, a resistance heater 272, one coil 274 of an induction motor similar to that previously described and line 276 back to the current source. The other branch of the circuit comprises line 262, a resistance 278, a fixed contact 280, a movable contact 282 carried by a bimetallic vibrator arm 284, a resistance heater 286, the other coil 288 of the induction motor, a variable resistance 290 in the form of a slide wire similar to that described in connection with FIGS. 1 to 8, a contact arm 292 engaging the slide wire and a collector ring like that previously described and line 276 back to the current source 260.

The resistance 278 is of such nature that it is extremely sensitive to temperature changes so that even slight temperature changes will materially alter the resistivity of the resistance. The other resistance 264 is substantially insensitive to temperature changes. With this arrangement any change in the temperature being measured will alter the resistance of the branch of the circuit which includes the coil 288 thereby changing the frequency of vibration of arm 284 to unbalance the frequency at which current is pulsed through the coils 274 and 288 and effect rotation of the rotor to which the contact arm 292 is connected. Rotation of the rotor and contact arm 292 not only indicates temperature change, but also changes the resistance 290 in this branch of the circuit an amount corresponding to the change in the resistance 278 to again balance both branches of the circuit. In this form of the invention each branch of the circuit is rapidly opened and closed by the vibrators 270 and 284. Any change in the resistance 278 as effected by a temperature change results in a corresponding change in the current through resistance 286 which either increases or decreases the amount of heat generated thereby to alter the frequency of vibration of the arm 284. The frequency of vibration of the arm 284 determines the rate at which current is pulsed through the coil 288 and any change will effect rotation of the rotor to indicate the temperature change and at the same time bring the system back into balance by effecting a corresponding change in the resistance 290.

It will be seen that by the present invention I have provided a self-balancing electrical circuit in which one branch of a series-parallel circuit is employed as a sensing device to indicate a change in the condition being sensed, the circuit including a thermoelectric vibrator in each branch of the circuit which causes current pulses through the two coils of an induction motor so that a change in the condition being sensed causes a change in the frequency of vibration of one of the vibrators and thereby in the frequency at which current is pulsed through the coils to effect rotation of a rotor which operates an indicating device, the rotation of the rotor being operable to change the frequency of the thermoelectric vibrator in a branch of the circuit to a value which brings the system back into balance.

While I have illustrated and described a preferred embodiment of my invention, it is understood that this is capable of modification, and I therefore do not wish to be limited to the precise details set forth but desire to avail myself of such changes and alterations as fall within the purview of the following claims.

I claim.

1. An electrical indicating apparatus comprising two balanced branches of a series parallel electrical circuit, the first and second branches each including an induction coil and a fixed resistance connected in series, a thermally actuated vibrator arm associated with each of said fixed resistances so as to vibrate at a frequency determined by the current flowing through said resistances, vibration of said vibrator arms effecting pulsation of the current through said branches, a condition sensing means for changing the frequency of vibration of the vibrator of the first branch of said circuit in response to a change in the condition being sensed, a shaded pole induction motor having a rotor and shaded poles associated with each of said coils and cooperable with said rotor for rotating the same in opposite directions whereby a change in the frequency of vibration in said first branch effects rotation of said rotor, an indicating device operated by said rotor, and means operable in response to movement of said rotor for changing the frequency of the vibrator of said first branch, to equal the frequency of the vibrator of the second branch so as to equalize the two branches of said circuit.

2. An electrical indicating apparatus comprising two balanced branches of a series parallel electrical circuit, the first and second branch including an induction coil and a fixed resistance connected in series, a thermally actuated vibrator arm associated with and forming a shunt circuit around each of said fixed resistances, each vibrator arm being thermally responsive to its fixed resistance so as to vibrate and thereby open and close said shunt circuit at a frequency determined by the current flowing through such resistance, thereby pulsating the current in each associated branch, a condition sensing means for producing an unbalance in the current and the vibration in each of the two branches in response to a change in condition being sensed, a shaded pole induction motor having a rotor and shaded poles associated with each of said coils and cooperable with said rotor for rotating the same in opposite directions, whereby an unbalanced frequency of said vibrators effects rotation of said rotor, an indicating device operated by said rotor, and means operable in response to movement of said rotor for rebalancing the current and the frequency of the vibrator of the two branches of said circuit.

3. An electrical indicating apparatus comprising two balanced branches of a series parallel electrical circuit, the first and second branches including a variable resistance, a fixed resistance and an induction coil connected in series, a thermally actuated bimetallic vibrator arm forming a shunt circuit around each of said fixed resistances, each vibrator arm being thermally responsive to its fixed resistance so as to open and close its shunt circuit at a frequency determined by the current flowing through the branch in which such vibrator is connected, thereby pulsing the current in said branch, an electrically conductive contact arm for each of said variable resistances, a shaded pole induction motor connected to one of said contact arms, its shaded poles being associated with said coil and cooperable with said rotor for rotating the same in opposite directions, a condition sensing means connected to the other of said contact arms to change the variable resistance associated therewith in accordance with a change in the condition being sensed thereby unbalancing the current and the frequency of the vibrators in the two branches of the circuit, to effect rotation of said rotor, said one contact arm being operable by said rotor to change the variable resistance so as to rebalance the current and the vibration of the two branches of the circuit.

4. An electrical indicating apparatus comprising two balanced branches of a series parallel electrical circuit, the first and second branches including an induction coil and a fixed resistance connected in series, a thermally actuated vibrator arm associated with each of said fixed resistances, each vibrator arm being thermally responsive to its said fixed resistance so as to vibrate at a frequency determined by the current flowing through such resistance, means including a pair of contacts for each vibrator forming respectively shunt circuits around said resistances, said contacts being opened and closed by said vibrators to open and close said shunt circuits thereby pulsating the current in each associated branch, a condition sensing means for changing the spacing of the pair of contacts of the first branch and thereby the frequency of the vibrator of said first branch of said circuit, in response to change in condition being sensed, a shaded pole induction motor and shaded pole associated with each of said coils and cooperable with said rotor for rotating the same in opposite directions, whereby a change in frequency of said vibrator of the first branch effects rotation of said rotor, an indicating device operated by said rotor, and means operable in response to movement of said rotor for changing the spacing of the vibrator contacts in the second branch, to equal the spacing of the vibrator contacts of the first branch and thereby equalize the frequency of pulse in the two branches of said circuit.

5. Apparatus according to claim 4 wherein one of the pair of contacts of the vibrator of the first branch of said circuit is mounted on a yieldable member movable in response to change in the condition being sensed.

6. Apparatus according to claim 5 including a cam rotatable with said rotor, one contact of the pair of contacts of the vibrator of the second branch of said circuit engaging said cam so as to vary the spacing of said pair of contacts in accordance to the position of said rotor to rebalance the circuit and translate the value of the yieldable member.

7. An electrical indicating apparatus comprising two balanced branches of a series parallel electrical circuit, the first and second branch including an induction coil and a fixed resistance connected in series, a thermally actuated vibrator arm associated with each of said fixed resistances, each vibrator arm being thermally responsive to its fixed resistance so as to vibrate and thereby open and close its branch of the circuit at a frequency determined by the current flowing through such resistance, a condition sensing means for changing the frequency of the vibrator of the first branch of said circuit in response to a change in the condition being sensed, a shaded pole induction motor having a rotor and shaded poles associated with each of said coils, and cooperable with said rotor for rotating the same in opposite directions whereby a change in the frequency of the vibrator of the said first branch effects rotation of said rotor, an indicating device operated by said rotor, and a contact arm operable in response to movement of said rotor for changing a variable compensating resistance in the first of said branches to equalize the current and the vibration of said first branch to the current and vibration of the second branch of said circuit.

8. Apparatus according to claim 7, wherein said condition sensing means comprises a resistance in each of the two branches of the circuit, the resistance of the first branch having a high temperature coefficient and the second branch having a low temperature coefficient.

References Cited in the file of this patent
UNITED STATES PATENTS

| | | |
|---|---|---|
| 2,270,991 | Bagno | Jan. 27, 1942 |
| 2,301,897 | Luhrs | Nov. 10, 1942 |
| 2,486,587 | Callahan | Nov. 1, 1949 |
| 2,519,667 | Koenig | Aug. 22, 1950 |
| 2,615,085 | Smulski | Oct. 21, 1952 |
| 2,762,997 | Boddy | Sept. 11, 1956 |

FOREIGN PATENTS

| | | |
|---|---|---|
| 570,725 | Great Britain | July 19, 1945 |